Nov. 29, 1938.   N. SNELLING   2,138,361
MARKING AND DISPLAY DEVICE
Filed April 6, 1937   4 Sheets-Sheet 1
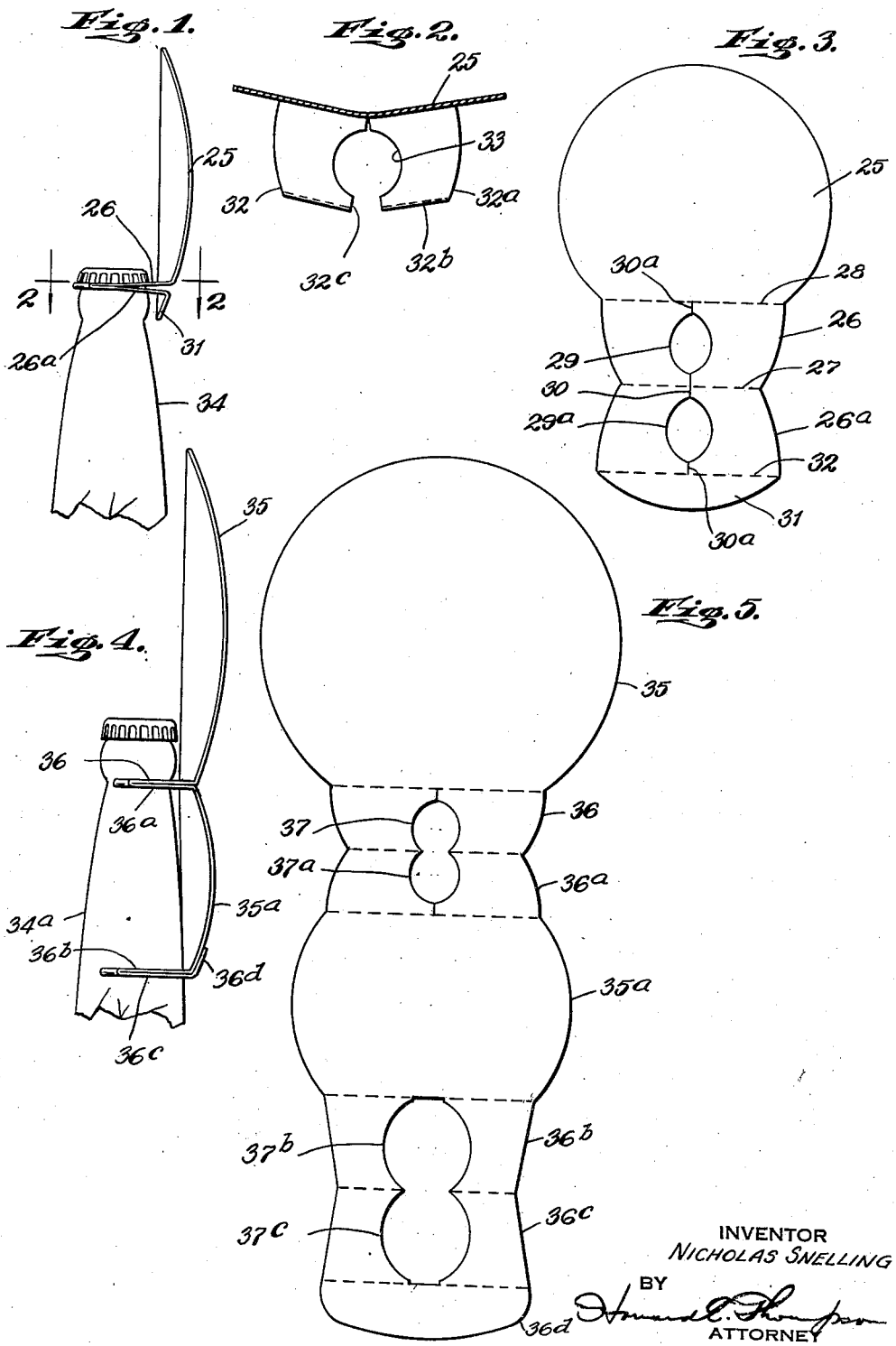
INVENTOR
NICHOLAS SNELLING
BY
ATTORNEY Nov. 29, 1938.  N. SNELLING  2,138,361
MARKING AND DISPLAY DEVICE
Filed April 6, 1937  4 Sheets-Sheet 2
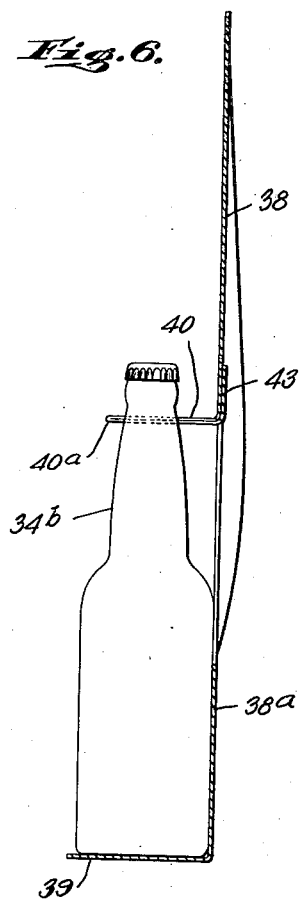
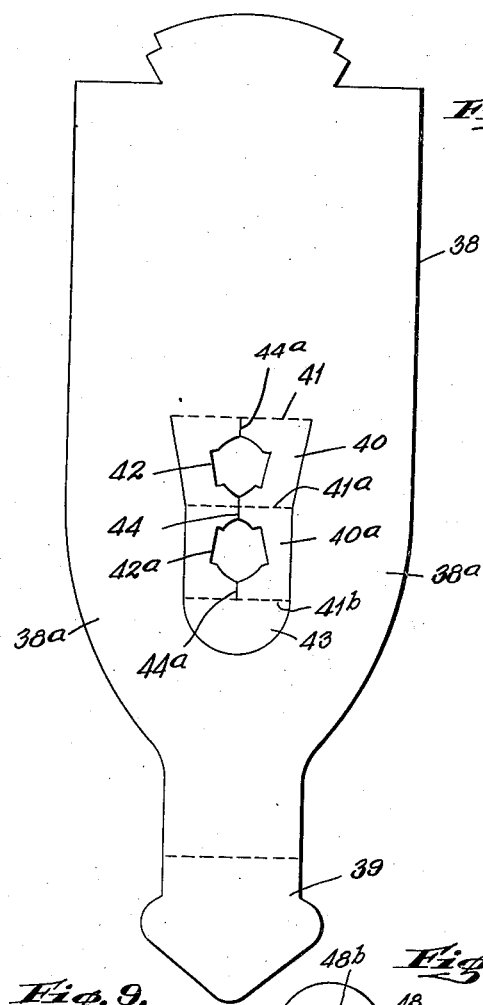
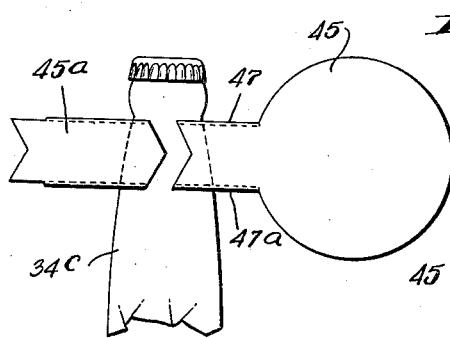
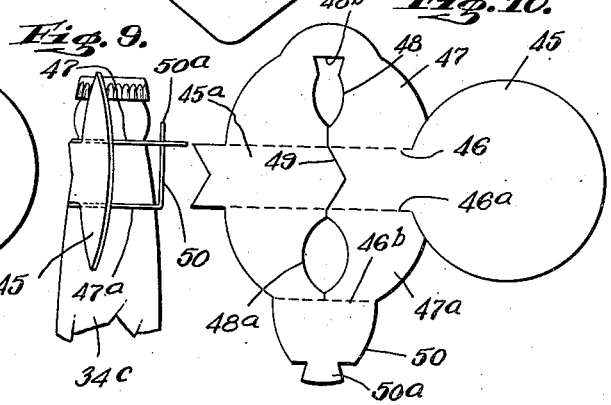
INVENTOR
NICHOLAS SNELLING
BY
*Howard C. Thompson*
ATTORNEY Nov. 29, 1938.  N. SNELLING  2,138,361
MARKING AND DISPLAY DEVICE
Filed April 6, 1937  4 Sheets-Sheet 3
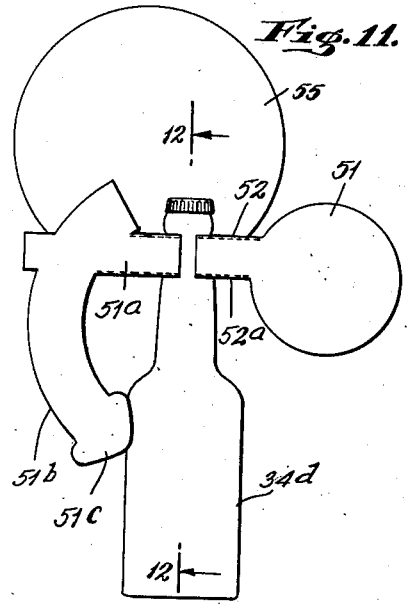
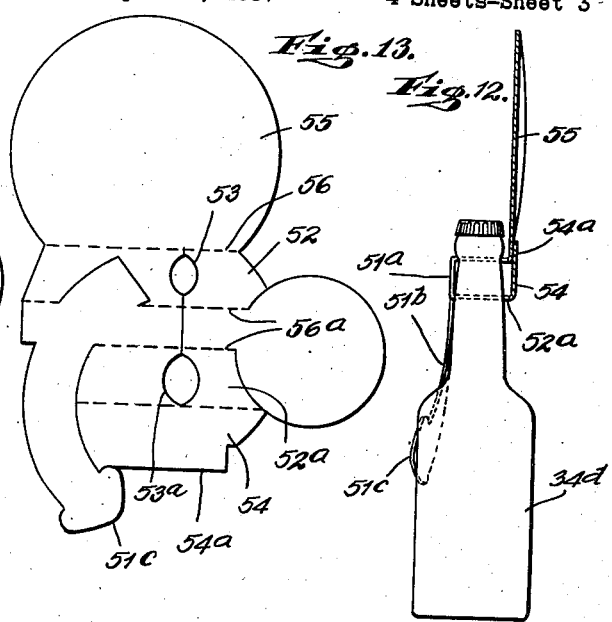
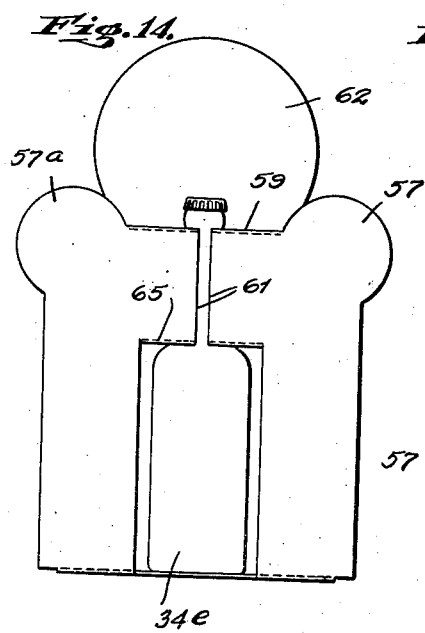
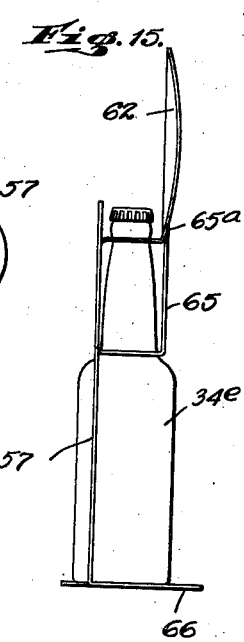
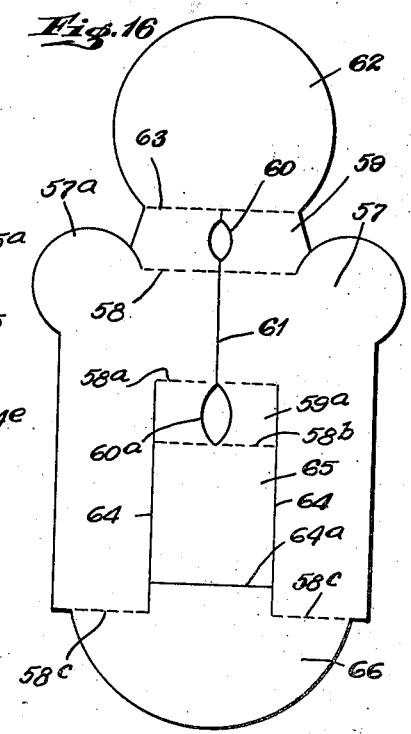
INVENTOR
NICHOLAS SNELLING
BY
ATTORNEY

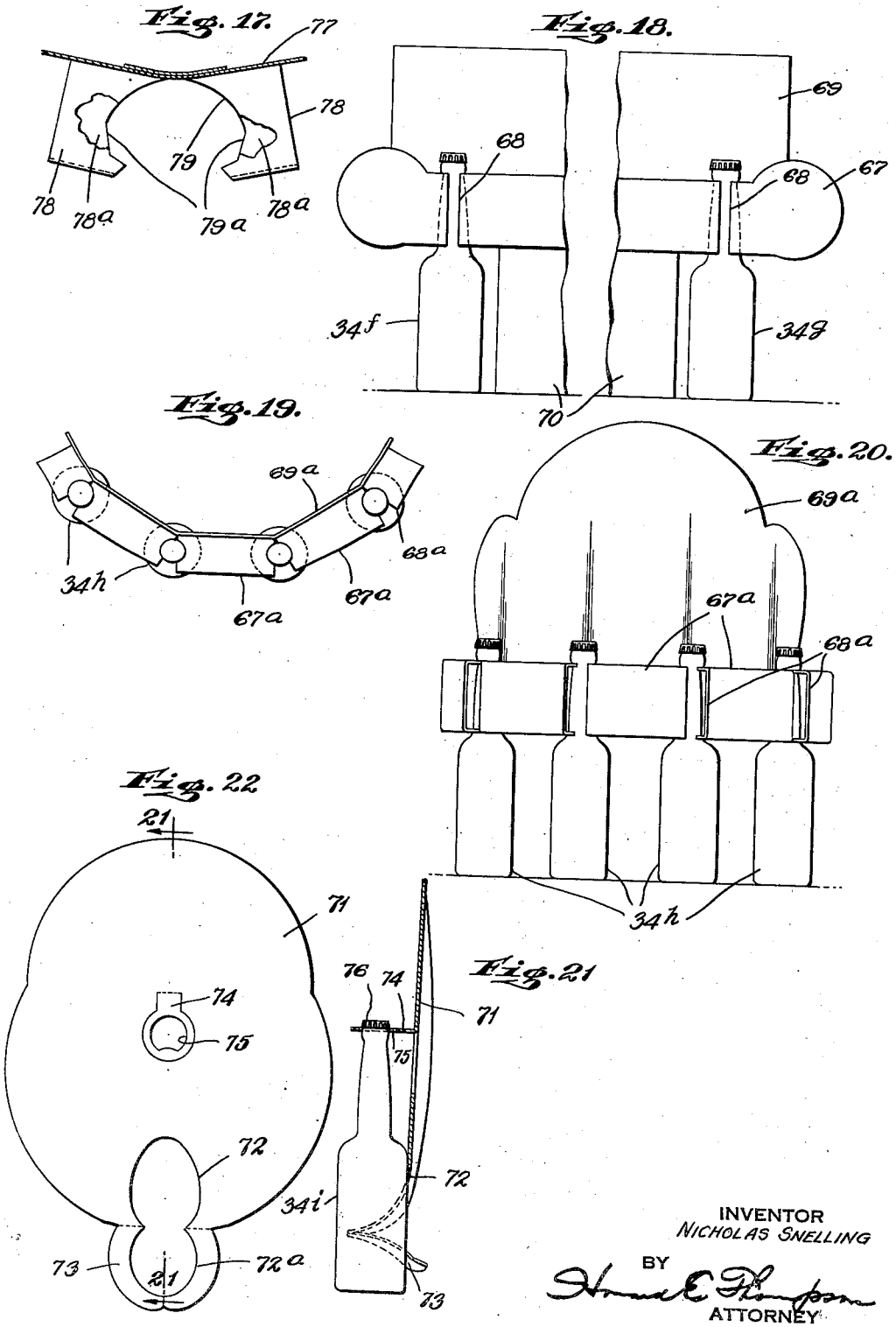

Patented Nov. 29, 1938

2,138,361

UNITED STATES PATENT OFFICE 2,138,361

MARKING AND DISPLAY DEVICE

Nicholas Snelling, Jackson Heights, Long Island, N. Y.

Application April 6, 1937, Serial No. 135,208

19 Claims. (Cl. 40—4)

This invention relates to devices for marking and otherwise displaying various kinds and classes of merchandise and particularly bottled, canned and packaged goods; and the object of the invention is to provide a marking and display device having means cut out to conform with the contour of a part of an article of merchandise and adapted to tensionally engage said part in supporting the device in connection with the merchandise and still further to the provision of a display portion on said device adapted to be flexed in supporting the same in conjunction with the article of merchandise to form an attractive display of the entire unit or assemblage; a further object being to provide a device of the class described which will engage spaced sections or areas of an article of merchandise in supporting the device in connection therewith and in giving greater stability to the complete device; a further object being to provide a display of the character described upon a portion of which the merchandise is adapted to be placed; a still further object being to provide a device of the character described in conjunction with which two or more articles of merchandise are adapted to be arranged in forming a unit display as well as in the arrangement of predetermined sections or parts of the display in angular position with respect to each other; and with these and other objects in view, the invention consists in a marking and display device of the character described which is simple in construction, efficient in use, and which is constructed as hereinafter described and claimed.

The invention is fully disclosed in the following specification, of which the accompanying drawings form a part, in which the separate parts of my improvement are designated by suitable reference characters in each of the views, and in which:

Fig. 1 is a side view of the upper end portion of a bottle illustrating one form of device which I employ mounted thereon.

Fig. 2 is a sectional view on the line 2—2 of Fig. 1, showing the device detached.

Fig. 3 is a plan view of the blank from which the device shown in Figs. 1 and 2 is formed.

Fig. 4 is a view similar to Fig. 1 showing a modified form of device.

Fig. 5 is a plan view of the blank from which the device shown in Fig. 4 is formed.

Fig. 6 is another view similar to Figs. 1 and 4, showing another modification.

Fig. 7 is a plan view of the blank from which the device shown in Fig. 6 is formed.

Fig. 8 is a face view of the upper portion of a bottle showing another form of device arranged thereon.

Fig. 9 is a side view of the structure shown in Fig. 8.

Fig. 10 is a plan view of the blank from which the device shown in Figs. 8 and 9 is formed.

Fig. 11 is a view similar to Fig. 8 showing another form of device.

Fig. 12 is a section substantially on the line 12—12 of Fig. 11 showing the bottle in elevation.

Fig. 13 is a plan view of the blank from which the device shown in Figs. 11 and 12 is formed.

Fig. 14 is a view similar to Fig. 11 showing another modification.

Fig. 15 is a side view of the structure shown in Fig. 14.

Fig. 16 is a plan view of the blank from which the device shown in Figs. 14 and 15 is formed.

Fig. 17 is a sectional view like Fig. 2, of devices similar to those shown in Figs. 11 to 16 inclusive showing a modified form of contour in the boundary walls of the recesses in which the article of merchandise is arranged.

Fig. 18 is a view similar to Figs. 11 and 14 showing a dual or multiple type of display.

Fig. 19 is a plan view of a multiple form of display having angularly disposed display sections.

Fig. 20 is a front view of the construction shown in Fig. 19.

Fig. 21 is a vertical sectional view through another form of device which I employ; and, Fig. 22 is a plan view of the blank from which the device shown in Fig. 21 is formed.

For the purpose of illustrating a few methods of carrying my invention into effect, I have shown in the accompanying drawings different types or arrangements of marking or display devices. While most of these devices have been shown as applied to a bottle, they are adaptable for use on any kind or class of package or container or article of manufacture, and the contour of the gripping section or sections of the display device will be made to conform with and fit snugly upon the walls of the article to be retained in firm engagement therewith. In all of the devices, a laterally flexible gripping section or part is provided on the device which is adapted to be extended or flexed laterally in engaging an article upon which the device is to be arranged and which will tensionally engage boundary walls of the article to frictionally and tensionally support the same against accidental displacement thereon. Another distinctive feature of the invention resides in the ability to use relatively thin sheet material which might be termed heavy paper or light cardboard and which may be supported in extended or display positions for an indefinite period of time by reason of the flexure contributed to the display sections or areas of the device as well as in the manner of coupling the device to one or more portions of the article in connection with which it is supported.

In Figs. 1 to 3 inclusive, I have shown one form of device fashioned from a blank similar to that shown in Fig. 3, the blank having a relatively large display or marking section 25 at the lower end of which are two similar supporting sections 26, 26a, foldable upon each other on the line 27. The section 26 is foldable with respect to the section 25 on the line 28. Each section 26, 26a is fashioned to form an aperture centrally thereof as seen at 29, 29a. These apertures are joined by a cut or slit portion 30 which traverses the fold line 27. The free edge of the section 26a may also be provided with a flange 31 foldable on the line 32 to provide added rigidity to the free edge of said section.

The device is normally shipped in its flat condition as illustrated in Fig. 3, or if desired, the parts 26 and 26a and 31 may be folded upon the section 25. In extending the device for use, the sections 26, 26a are brought together and arranged substantially at right angles to the section 25 in the manner illustrated in Figs. 1 and 2 of the drawings. The side portions 32, 32a of the sections 26, 26a collectively are capable of lateral extension or separation, especially at the forward edges 32b thereof so as to expand the aperture 33 formed between the side portions 32, 32a in the operation of applying the device to the upper end of a bottle 34 as indicated in Fig. 1 of the drawings. When the device is applied to the bottle as shown, the side portions 32, 32a move inwardly and tensionally engage the wall of the bottle to frictionally retain the device thereon. In the latter operation, the adjacent ends 32c of the side portions 32, 32a do not meet and the display section 25 as well as the flange 31 is supported in the flexed position shown which maintains said device in an upright or perpendicular position and gives rigidity and stablity to the device, that is to say, if the display section 25 is forced forwardly or backwardly, it will immediately bring back to its normal or upright position by virtue of the flexure thereof, thus producing a neat and attractive appearance for the device at all times. The sections 26, 26a are slit or cut as seen at 30a to aid in the lateral extension or separation of the side portions 32, 32a.

In Figs. 4 and 5 of the drawings, I have shown a slight modification of the construction shown in Figs. 1 and 3 which consists in simply adding a device similar to that shown in the first mentioned figures, namely, the sections 35, 36 and 36a, the sections 36b and 36c, the latter including a projecting flange 36d. The sections 36a and 36b are separated by a spacing and supplemental display section 35a. With this construction, the sections 36, 36a are provided with co-registering apertures 37, 37a and the sections 36b and 36c are provided with other co-registering apertures 37b, 37c, the latter being larger than the former to engage a larger diameter of the bottle 34a as clearly seen in Fig. 4. The only other difference in the structure shown in Figs. 4 and 5 consists in eliminating the cut or slit 30 and having adjacent portions of the apertures 37, 37a, 37b, 37c register with each other. With this arrangement of apertures, laterally flexing mounting parts of the device will not encircle the bottle to the degree shown in Fig. 1 but will encircle it sufficiently to pass the center line of the bottle to retain the same against displacement therefrom. At this time, it will be understood that the display sections 25, 35, 35a may be of any desired outline or contour to be consistent with any particular type or kind of merchandise being arranged on display, and the same is shown circular, simply to represent the simplest form of display which would be employed. The flange 36d is extended upwardly upon the section 35a instead of extending downwardly as in Fig. 1 of the drawings.

In Figs. 6 and 7 of the drawings, I have shown another form of construction wherein the display section 38 is arranged to extend downwardly along the sides of the article of merchandise placed on display, for example, the bottle 34b in the manner shown at 38a in Fig. 7 of the drawings. The lower end of the parts 38a is contracted and terminates in a folding flange or bottom wall part 39 upon which the article of merchandise, for example, the bottle 34b is adapted to rest. The central portion of the display is cut out to form two foldably related coupling sections 40, 40a which are similar to the sections 26, 26a in general form and use, the section 40 being foldable on the line 41 with respect to the display section 38 to extend both sections 40, 40a in an outward direction as indicated in Fig. 6 of the drawings. Said sections are provided with irregular apertures 42, 42a which are adapted to register with each other when the sections 40, 40a are folded upon each other on the line 41a. Attached to the section 40a is a flange 43 foldable on the line 41b onto the rear surface of the section 38 as clearly seen in Fig. 6 of the drawings, and the same may be glued or otherwise secured thereto. The blank may be shipped in this condition, it being understood that the folded parts 40, 40a may be brought into the longitudinal plane of the blank for this purpose. The apertures 42, 42a are joined by a cut or slit 44 which operates similar to the slit 30, and other slits 44a are provided on the sections 40, 40a to provide the lateral flexibility of the side portions of the sections 40, 40a in attachment with the bottle 34b. With this type of construction, it is not essential that the contour of the apertures 42, 42a conform with the peripheral wall of the bottle but simply to tensionally engage the bottle to flex the display section 38 including parts 38a thereof to maintain perpendicular position of said parts. It is only when the display is depending for its mounting on the article of merchandise by the apertured mounting section that it is desirable to conform with and snugly fit the contour of the article in connection with which the display is supported.

In Figs. 8, 9 and 10 of the drawings, I have shown another form of construction wherein the display consists of two side sections 45, 45a which may be arranged at the front or at the rear of an article, such for example as the bottle 34c. These sections constitute part of a unitary blank as seen in Fig. 10 of the drawings which is foldable on the lines 46, 46a to form upper and lower supporting wall parts 47, 47a having a small aperture 48 and a larger aperture 48a respectively to engage narrow and wider cross sectional areas of the bottle, the apertures being joined by a staggered slit or cut 49 which provides lateral flexure of the side portions of the supporting walls 47, 47a as well as relative movement of the display sections 45, 45a in mounting the device upon the bottle or other support. With this construction, the bottom wall 47a includes a projecting back wall member 50 which is foldable on the line 46b and the free edge of the wall 50 is provided with a dove-tailed tongue 50a adapted to enter a dove-tail notch 48b opening into the aperture 48 to maintain the walls 47 and 47a in a definitely spaced relationship to each other when arranged upon the bottle or other support.

In Figs. 11, 12 and 13, I have shown another adaptation of the structure shown in Figs. 8, 9 and 10 wherein the display portions 51, 51a are substantially similar in general construction to the displays 45, 45a and include substantially similar upper and lower supporting walls 52, 52a having the apertures 53, 53a. The back wall 54 instead of having the coupling tongue 50a is provided with a projecting flange 54a which may be glued to the rear surface of a display section 55 foldable with respect to the rear edge of the top wall 52 on the line 56 and which is adapted to be flexed in the attachment of the walls 52, 52a with the bottle or other support 34d. Another difference in the structure shown in Figs. 11 to 13 inclusive resides in the provision of a supplemental display member 51b as a part of the display 51a which is cut from the material of the top and bottom walls, but is not foldable on the fold lines 56a, thus disposing the supplemental display in alinement with the display 51a, and the lower end portion 51c of the supplemental display 51b may be disposed in position to engage the bottle 34d in the manner indicated.

In Figs. 14, 15 and 16, I have shown another adaptation of the invention which incorporates the principles of the display shown in Figs. 6 and 7 and that shown in Figs. 8 to 13 inclusive. With this construction, I provide two similar side display sections 57, 57a which are adapted to be arranged at the front portion of the article or bottle 34e. The blank from which the device is formed is foldable on the lines 58, 58a to form top and bottom supporting walls 59, 59a having apertures 60, 60a, the apertures being joined by a slit or cut 61 which serves to divide or separate the displays 57, 57a in the manner illustrated in Fig. 14 of the drawings. A top and back display 62 is foldable with respect to the top wall 59 on the line 63. The lower portion of the blank is cut on the vertical lines 64 to separate the bottom wall 59 from the blank to permit folding on the line 58a. Foldable on the line 58b is a supplemental back wall 65, the upper edge of which is adapted to be secured to the display back 62 as indicated at 65a. The supplemental back 65 is severed from the bottom supporting wall 66 of the blank on the line 64a, the bottom being foldable on the lines 58c to dispose the same at right angles to the perpendicular displays 57, 57a in the manner clearly illustrated in Fig. 15 of the drawings. The bottle or other article 34e may be placed on the bottom wall 66, as seen. Here again, it will be apparent that the contour of the sections 57, 57a and 62 may be made to suit the merchandise to be displayed. While it is stated that the sections 57, 57a are disposed at the front or front sides of the article, they may be disposed at the rear thereof, in which event, the section 62 will be arranged at the front and the part 65 will constitute an additional display part.

In Fig. 18 as well as in Figs. 19 and 20, I have shown other adaptations and uses of constructions similar to that shown in Figs. 8 to 13 inclusive as well as 14, 15 and 16 except that the bottom wall 66 is omitted. To simplify the description, the various parts or sections will be referred to briefly, it being understood that the structure and arrangement thereof will be generally the same as that shown in said other figures.

In Fig. 18, I have shown a method of forming a dual or multiple display to dispose two or more bottles 34f, 34g or other articles of merchandise in spaced relation to each other in a common plane. The display sections 67 have two cut out and supporting portions 68 formed in spaced top and bottom walls substantially similar to the walls 59 and 59a. The upper wall has a top display section 69 and the lower wall has a bottom display section 70. The display sections 69 and 70 are continuous and of any desired contour, and these sections may be arranged at either the front or rear of the merchandise.

The only difference in the structure shown in Figs. 19 and 20 from that shown in Fig. 18 resides in the angular arrangement of a multiplicity of display sections 67a and the corresponding arrangement or flexure of the back display 69a to produce a result substantially similar to that indicated in Fig. 19 of the drawings wherein a number of bottles or other articles of merchandise 34h are arranged in an irregular or curved path, it being understood that the cut out sections 68a will be the same as those shown at 68 or as in the other figures referred to.

In Figs. 19 and 20, the bottom display section 70 shown in Fig. 18 is omitted simply to illustrate that the use of such a section is not essential as the display may be disposed entirely upon the top portions of the articles of merchandise and arranged thereabove. On the other hand, it will be understood that devices such as shown in Figs. 8, 9 and 10 may be employed in joining or coupling two or more articles of merchandise arranged in the same plane or in a curved or arcuate plane. In this way, a group of merchandise may be attractively displayed with one continuous display member, which in addition to being firmly supported on the respective articles will also serve to maintain these articles in desired spaced relationship to each other and against relative movement. This type of a display would be especially desirable in constructing window displays where the merchandise is pyramided or piled one upon the other and will serve to prevent bottles or other articles of merchandise from falling when arranged on display.

In Figs. 21 and 22, I have shown another adaptation of the invention wherein a relatively large display section is employed and the lower end portion of this section is cut out to form two registering apertures 72, 72a, the latter being formed in a foldable loop 73 which is foldable or movable onto the display section 71 or adapted to be arranged in the position shown in Fig. 21 of the drawings to firmly and tensionally engage the lower end portion of the bottle or other support 34i which will flex the display 71 when mounted upon the bottle to maintain the same in a perpendicular or substantially perpendicular position.

With this construction, it is also desirable in some instances to provide a supplemental mounting member 74 in the form of a foldable tube having an aperture 75 therein adapted to frictionally pass over the upper end portion of the bottle, preferably adjacent the cap or closure 76 thereon, especially in supporting a large display in connection with the bottle. In some instances, a member consisting of parts similar to the parts 26, 26a, as shown in Figs. 1 to 3 inclusive may be substituted for the member 74. With the type of construction shown in Figs. 21 and 22, it is desirable that the apertures 72, 72a be such as to fit snugly upon the article in the tensional engagement of the walls of said apertures with the article in order to maintain the flexure in the display section 71.

In Fig. 17 of the drawings, I have shown for the purpose of illustrating the adaptation of the several forms of devices shown in the other figures to articles of merchandise of other cross sectional form, one form of such irregular contour as well as to show a wider spaced relationship of the laterally flexed supporting wall members. In this figure, 77 represents the display section which would be equivalent to the display section shown in the other figures, and 78, 78a will represent wall members similar, for example, to the wall members 47, 47a and others, each having apertures 79, 79a of the irregular contour shown so as to fit upon a bottle or other article of merchandise of a contour similar to that shown.

The device as represented in Fig. 17 of the drawings is in the position of the parts thereof when applied to the article of merchandise, although such article is not shown. In other words, the device as represented in Fig. 17 would be adaptable for use on the lower wide end portion of a bottle or similar article. In this connection, it will be apparent that if the devices shown in the other figures, for example, the device shown in Figs. 8 to 10 inclusive, were arranged on the wide lower portion of the bottle, the apertures 48, 48a would be considerably larger to conform with such larger diameter of the bottle.

From the foregoing, it will be apparent that in all of the devices shown, the supporting walls or sections of the display or the side portions thereof are freely movable in opposite directions in the operation of applying the device to an article of merchandise, and these side portions flex or spring inwardly to firmly or tensionally engage the article while leaving or maintaining the display sections in a flexed condition which serves to support said sections in perpendicular or upright position at all times and to maintain such position even though they are subject to accidental flexure.

A device of the character described may be made up in many forms and designs in displaying and advertising various kinds and classes of bottled, canned and packaged goods as well as articles of merchandise to which the device may be applied or on various sections or areas of a large piece of merchandise to call the public's attention to certain structural features of a large piece of merchandise or apparatus. In certain other instances, the display may be utilized as a hanger or as a means of suspending merchandise placed on display, especially with a structure similar to that illustrated in Figs. 19 and 20.

It will be seen upon a consideration of the several views, that the cut-outs or apertures formed in the blank to receive the article in conjunction with the slits or cuts formed in the connecting wall between the apertured walls when arranged in spaced relationship to each other form what may be termed hook-shaped portions which are adapted to be flexed or moved laterally in the movement of mounting the device on its support and which maintain a flexed position when the device is mounted on the support to keep the display section integral with one of the apertured walls in a flexed condition and to insure tensional and frictional engagement of the device with the support.

Having fully described my invention, what I claim as new and desire to secure by Letters Patent, is:

1. A device of the class described comprising a sheet of material fashioned to form spaced and substantially parallel wall members joined and spaced by a connecting wall, said first named wall members having apertures arranged in common alinement and opening through said connecting wall, the connecting wall being severed where the apertures open therethrough to form separate relatively movable parts thereof and of the first named wall members at opposite sides of said apertures, and means involving a display section integral with at least one of the first named wall members to normally support the separate or side parts thereof and said first named wall members in contracted position while permitting separation thereof under tension.

2. A device of the class described comprising a display section, two wall members extending angularly from the display section at spaced positions thereon, said wall members having apertures intermediate the ends thereof and extending from the display section outwardly and opening through the outer edges of said wall members to divide said wall members into laterally movable or flexible parts at opposite sides of said apertures, said parts being adapted to be flexed laterally in mounting the device on an article and to tensionally engage the article in supporting the display section in flexed position.

3. A device of the class described comprising a sheet of material fashioned to form spaced and substantially parallel wall members joined and spaced by a connecting wall, said first named wall members having apertures arranged in common alinement and opening through said connecting wall, the connecting wall being severed where the apertures open therethrough to form separate relatively movable parts thereof and of the first named wall members at opposite sides of said apertures, means involving a display section integral with at least one of the first named wall members to normally support the separate or side parts thereof and said first named wall members in contracted position while permitting separation thereof under tension, the contour of the boundary edges of the apertures in said first named wall member conforming with and fitting snugly upon the contour of an article upon which the device is supported, and the size and contour of the aperture in one wall member being different from that in the other wall member.

4. A device of the class described comprising a sheet of material fashioned to form spaced and substantially parallel wall members joined and spaced by a connecting wall, said first named wall members having apertures arranged in common alinement and opening through said connecting wall, the connecting wall being severed where the apertures open therethrough to form separate relatively movable parts thereof and of the first named wall members at opposite sides of said apertures, means involving a display section integral with at least one of the first named wall members to normally support the separate or side parts thereof and said first named wall members in contracted position while permitting separation thereof under tension, and said first named wall members and the connecting wall having other apertured and severed sections arranged in spaced relation to said first named apertures to engage and support another article arranged in spaced relation to the article arranged in said first named apertures.

5. A device of the class described comprising a sheet of material fashioned to form spaced and substantially parallel wall members joined and spaced by a connecting wall, said first named wall members having apertures arranged in common alinement and opening through said connecting wall, the connecting wall being severed where the apertures open therethrough to form separate relatively movable parts thereof and of the first named wall members at opposite sides of said apertures, means involving a display section integral with at least one of the first named wall members to normally support the separate or side parts thereof and said first named wall members in contracted position while permitting separation thereof under tension, said first named wall members and the connecting wall having other apertured and severed sections arranged in spaced relation to said first named apertures to engage and support another article arranged in spaced relation to the article arranged in said first named apertures to form independent display sections between the spaced articles on which the device is supported, and said independent sections being offset with respect to each other.

6. A device of the class described comprising a sheet of material fashioned to form spaced and substantially parallel wall members joined and spaced by a connecting wall, said first named wall members having apertures arranged in common alinement and opening through said connecting wall, the connecting wall being severed where the apertures open therethrough to form separate relatively movable parts thereof and of the first named wall members at opposite sides of said apertures, means involving a display section integral with at least one of the first named wall members to normally support the separate or side parts thereof and said first named wall members in contracted position while permitting separation thereof under tension, the contour of the boundary edges of the apertures in said first named wall members conforming with and fitting snugly upon the contour of an article upon which the device is supported, and said connecting wall forming a display portion on the device and other means for coupling the first named wall members independent of said connecting wall.

7. A device of the class described comprising a sheet of material fashioned to form spaced and substantially parallel wall members joined and spaced by a connecting wall, said first named wall members having apertures arranged in common alinement and opening through said connecting wall, the connecting wall being severed where the apertures open therethrough to form separate relatively movable parts thereof and of the first named wall members at opposite sides of said apertures, means involving a display section integral with at least one of the first named wall members to normally support the separate or side parts thereof and said first named wall members in contracted position while permitting separation thereof under tension, the contour of the boundary edges of the apertures in said first named wall members conforming with and fitting snugly upon the contour of an article upon which the device is supported, said connecting wall forming a display portion on the device, other means for coupling the first named wall members independent of said connecting wall, and said connecting wall extending to form other means for engaging the article in connection with which the device is supported.

8. A device of the class described comprising a single sheet of thin material shaped to form a display section, means fashioned from the material of said sheet inwardly of side edges thereof and foldable relatively thereto for forming two relatively movable substantially hook-shaped portions separated by an opening extending to the display section, said hook-shaped portions by reason of said opening being adapted to be moved laterally and to flex the display section and tensionally moved into engagement with a suitable article in connection with which the device is supported by said flexed section, said hook-shaped portions serving to support the display section in flexed condition when the device is arranged upon its support, and each of said spaced hook-shaped portions being composed of two thicknesses of the sheet from which the device is formed.

9. A device of the class described comprising a sheet of material cut and blanked to form foldably related article engaging sections and a display part extending perpendicularly from at least one section, said sections having apertures adapted to receive a predetermined part or parts of an article on which the device is to be arranged, said apertures extending to the display part and opening outwardly through at least one edge of each of said sections to merge said apertures, the merged apertured portions of said sections forming opposite side portions movable relatively to each other and normally supported by said display part in juxtaposition to each other, and the opposite sides of said sections being adapted to move one with respect to the other by flexing said display part in applying the device to an article of merchandise and to tensionally support the device thereon by the flexure of said display part.

10. A device of the class described comprising a sheet of material cut and blanked to form foldably related article engaging sections and a display part extending perpendicularly from at least one section, said sections having apertures adapted to receive a predetermined part or parts of an article on which the device is to be arranged, said apertures extending to the display part and opening outwardly through at least one edge of each of said sections to merge said apertures, the merged apertured portions of said sections forming opposite side portions movable relatively to each other and normally supported by said display part in juxtaposition to each other, the opposite sides of said sections being adapted to move one with respect to the other by flexing said display part in applying the device to an article of merchandise and to tensionally support the device thereon by the flexure of said display part, and said sheet including another non-flexed display part.

11. A device of the class described comprising a sheet of material cut and blanked to form foldably related article engaging sections, said sections being spaced apart on the resulting device by an intermediate portion of said sheet, said sections having apertures fashioned to conform with and fit the size of spaced portions of an article engaged by said sections, said apertures opening outwardly through the edge thereof joining said intermediate portion, said intermediate portion being severed in alinement with the apertures of said sections to permit relative movement of said edge portions of the sections in applying the device to the article of merchandise and in tensionally supporting the device thereon.

12. A device of the class described comprising a sheet of material cut and blanked to form foldably related article engaging sections, said sections being spaced apart on the resulting device by an intermediate portion of said sheet, said sections having apertures fashioned to conform with and fit the size of spaced portions of an article engaged by said sections, said apertures opening outwardly through the edge thereof joining said intermediate portion, said intermediate portion being severed in alinement with the apertures of said sections to permit relative movement of said edge portions of the sections in applying the device to the article of merchandise and in tensionally supporting the device thereon, said intermediate portion forming a display section for the device, and another display section foldable with respect to one of the first named sections and adapted to be supported in flexed condition when the device is arranged upon an article.

13. A device of the class described comprising a sheet of material cut and blanked to form foldably related article engaging sections, said sections being spaced apart on the resulting device by an intermediate portion of said sheet, said sections having apertures fashioned to conform with and fit the size of spaced portions of an article engaged by said sections, said apertures opening outwardly through the edge thereof joining said intermediate portion, said intermediate portion being severed in alinement with the apertures of said sections to permit relative movement of said edge portions of the sections in applying the device to the article of merchandise and in tensionally supporting the device thereon, said intermediate portion forming a display section for the device, another display section foldable with respect to one of the first named sections and adapted to be supported in flexed condition when the device is arranged upon an article, and other display sections extending from said first named display section.

14. A device of the class described comprising a sheet of material cut and blanked to form foldably related article engaging sections, said sections being spaced apart on the resulting device by an intermediate portion of said sheet, said sections having apertures fashioned to conform with and fit the size of spaced portions of an article engaged by said sections, said apertures opening outwardly through the edge thereof joining said intermediate portion, said intermediate portion being severed in alinement with the apertures of said sections to permit relative movement of said edge portions of the sections in applying the device to the article of merchandise and in tensionally supporting the device thereon, said intermediate portion forming a display section for the device, another display section foldable with respect to one of the first named sections and adapted to be supported in flexed condition when the device is arranged upon an article, other display sections extending from said first named display section, and other means coupling said apertured sections to support the same in spaced relation to each other.

15. A device of the class described comprising a display portion, wall members foldable with respect to side edges of the display portion and arranged substantially in parallel relationship to each other angularly to said display portion, said wall members having apertures opening outwardly through the edges thereof joining said display portion, said display portion being severed to merge the apertures of said wall members to provide lateral movement of the side portions of said wall members to expand and contract the apertures therein to fit snugly upon the peripheral walls of a predetermined article upon which the device is supported, and means for supporting the side portions of the wall members normally in juxtaposition.

16. A device of the class described comprising a display portion, wall members foldable with respect to side edges of the display portion and arranged substantially in parallel relationship to each other angularly to said display portion, said wall members having apertures opening outwardly through the edges thereof joining said display portion, said display portion being severed to merge the apertures of said wall members to provide lateral movement of the side portions of said wall members to expand and contract the apertures therein to fit snugly upon the peripheral walls of a predetermined article upon which the device is supported, means for supporting the side portions of the wall members normally in juxtaposition, and said last named means comprising a display section adapted to be flexed when the device is mounted upon a predetermined article.

17. A device of the class described comprising a display portion, wall members foldable with respect to side edges of the display portion and arranged substantially in parallel relationship to each other angularly to said display portion, said wall members having apertures opening outwardly through the edges thereof joining said display portion, said display portion being severed to merge the apertures of said wall members to provide lateral movement of the side portions of said wall members to expand and contract the apertures therein to fit snugly upon the peripheral walls of a predetermined article upon which the device is supported, means for supporting the side portions of the wall members normally in juxtaposition, said last named means comprising a display section adapted to be flexed when the device is mounted upon a predetermined article the apertures in said wall members extending to said display portion, and the apertures in the respective wall members varying as to size and contour to fit and conform with the different size and contour of different parts of the article engaged by said wall members.

18. A device of the class described comprising a single sheet of thin material shaped to form a display section, said sheet having two wall parts foldable with respect to the display section to extend angularly thereto, each of said wall parts having an aperture opening through one edge thereof, means for merging the apertures of the respective wall parts through said edges to form relatively movable side portions for said wall parts, the apertures of said wall parts being shaped to fit an article of merchandise upon which the device is supported, and said display section being flexed by the separation of said apertured wall parts in tensionally engaging the article upon which the device is arranged.

19. A device of the class described comprising a single sheet of thin material shaped to form a display section, said sheet having two wall parts foldable with respect to the display section to extend angularly thereto, each of said wall parts having an aperture opening through one edge thereof, means for merging the apertures of the respective wall parts through said edges to form relatively movable side portions for said wall parts, the apertures of said wall parts being shaped to fit an article of merchandise upon which the device is supported, said display section being flexed by the separation of said apertured wall parts in tensionally engaging the article upon which the device is arranged, and said apertured wall parts being arranged in spaced relation to each other on said sheet and joined by a supplemental display section.

NICHOLAS SNELLING.